United States Patent Office 3,813,416
Patented May 28, 1974

3,813,416
SUBSTITUTED GAMMA-BUTYROLACTONES DERIVED FROM $C_{16}$ AND GREATER UNSATURATED ACIDS
El Ahmadi I. Heiba, Princeton, and Ralph M. Dessau, Highland Park, N.J., assignors to Mobil Oil Corporation
No Drawing. Continuation-in-part of applications Ser. No. 799,940, Feb. 17, 1969, and Ser. No. 30,582, Apr. 21, 1970, which is a continuation-in-part of application Ser. No. 714,447, Mar. 20, 1968, all now abandoned. This application Sept. 7, 1971, Ser. No. 178,392
Int. Cl. C07d 5/06
U.S. Cl. 260—343.6
12 Claims

ABSTRACT OF THE DISCLOSURE

This specification discloses a lactone having the formula

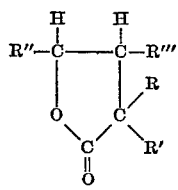

In this formula R and R' are hydrogen or an alkyl group containing 1 to 3 carbon atoms, R is the same as or different from R' and the total number of carbon atoms in R and R' does not exceed 3. One of R'' or R''' is an alkyl or an alkenyl group, and the other is a carboxyalkyl, carboxyalkenyl, esteralkyl, or esteralkenyl group, the sum of the number of carbon atoms in R'' and R''' being at least 14. These lactones can be employed to produce a long chain dicarboxylic acid having a gamma- or beta-hydroxy group which can be used in forming alkyd resins or detergents. The lactones are also useful as lubricants for metal parts.

CROSS REFERENCE TO RELATED APPLICATIONS

This application is a continuation-in-part of copending applications Ser. Nos. 799,940, filed Feb. 17, 1969, now abandoned, and 30,582, filed Apr. 21, 1970, now abandoned. These latter applications are continuations-in-part of application Ser. No. 714,447, filed Mar. 20, 1968, and now abandoned.

BACKGROUND OF THE INVENTION

Field of the invention

This invention relates to substituted gamma-butyrolactones derived from mono- and poly-unsaturated monocarboxylic acids and esters thereof.

Description of the prior art

U.S. Pat. No. 3,155,685, issued Nov. 3, 1964, discloses substituted gamma-butyrolactones. The substituents on the alpha carbon atom of these lactones are hydrogen and a

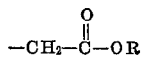

group where R is a hydrocarbyl, hydrocarbyloxyalkyl, alkoxyethoxyalkyl, acyloxyalkyl, and halohydrocarbyl radicals of less than 18 carbon atoms and free of non-benzenoid unsaturation. The substituents on the beta carbon atom may be hydrogen or a hydrocarbyl, hydrocarbyloxy, halohydrocarbyl, halohydrocarbyloxy, hydrocarbyloxyalkyl, carboalkoxy, acyl, carboalkoxyalkyl, cyano, cyanohydrocarbyl, carboxy, carboxyalkyl, or acyloxy radical of less than 32 carbon atoms and free of non-benzenoid unsaturation. The substituent on the gamma carbon atom is a

group wherein $R_1$ and $R_2$ are hydrogen or any of the radicals just mentioned.

U.S. Pat. No. 3,270,035, issued Aug. 30, 1966, also discloses substituted gamma-butyrolactones. The substituents on the alpha carbon atom of these lactones are hydrogen and an octyl carboxymethyl group. The substituents on the beta carbon atom are hydrogen. The substituents on the gamma carbon atom are hydrogen and a hexyl group.

SUMMARY OF THE INVENTION

In accordance with the invention, there is provided a lactone having the formula

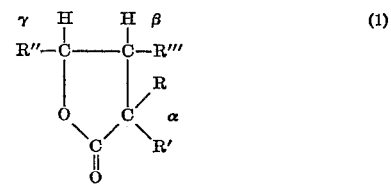

In this formula, R and R' are hydrogen or an alkyl group containing 1 to 3 carbon atoms. R is the same as or different from R'. The total number of carbon atoms in R and R' does not exceed 3. One of R'' or R''' is an alkyl or an alkenyl group and the other is a carboxyalkyl, carboxyalkenyl, esteralkyl, or esteralkenyl group. The total number of carbon atoms in the R'' and R''' groups is at least 14.

In the formula above, the alpha, beta, and gamma carbon atoms are labeled.

DESCRIPTION OF THE PREFERRED EMBODIMENTS

The lactones of the present invention can be prepared employing the process described in copending application Ser. No. 30,582, filed Apr. 21, 1970, now abandoned. In this process, a solution containing an olefinic reactant is reacted by heating for a period of time with a carboxylic acid in the presence of a metal ion of higher valent form such as trivalent manganese ion. The carboxylic acid must contain at least 1 hydrogen atom on the alpha carbon atom. The reaction may be carried out by heating to temperatures between 80° C. and 100° C. The time of reaction may be an hour or less to 5 to 10 hours or more. An inert atmosphere, such as one of nitrogen, carbon dioxide, helium, and the like, is desirably maintained over the reaction mixture to lessen or avoid oxidation by air.

The solvent for the solution, in which the compound of metal must also be soluble, may be the carboxylic acid to be reacted with the olefinic reactant. However, the solvent may be another compound such as an anhydride or ester of the carboxylic acid. Aliphatic esters and aliphatic hydrocarbons may also be employed as solvents. Besides manganese, other higher valent metal ions such as cerium, vanadium, and nickel may be employed. In the reaction mixture, the concentration of the olefinic reactant may range from 0.01 to 3 moles, preferably 0.25 to 1 mole, per mole of metal compound. The amount of carboxylic acid to be employed will be discussed later.

In the process of the copending application, the carboxylic acid reacts with the ion of the metal in higher valent form to form a free radical. Concomitantly, the ion of the metal is reduced to a lower valent form. Thus, where manganic ion, Mn⁺³, is employed, it is reduced to manganous ion, Mn⁺². The free radical then reacts with the olefinic reactant to form the lactone.

For the preparation of the substituted gamma-butyrolactones of the present invention, employing the process disclosed in the aforementioned copending application, the olefinic reactant is a mono- or poly-unsaturated monocarboxylic acid having at least 16 carbon atoms per molecule or is an ester thereof. The mono- or poly-unsaturated monocarboxylic acid or ester will have the formula $$R''-CH=CH-R'''$$

wherein R'' and R''' have the definitions given before.

Typical of acids to be employed are palmitoleic, oleic, elaidic, petroselic, linoleic, linolenic, ricinoleic, vaccenic, eleostearic, licanic, parinaric, tariric, gadoleic, arachidonic, cetoleic, erucic, and selacholeic. Oleic acid is particularly preferred. Preferably, the acid does not contain more than 20 carbon atoms per molecule.

Esters of the foregoing acids formed by reacting the acids with a wide variety of alcohols can also be used as the olefinic reactant for forming the lactones. The alcohols can be saturated or unsaturated, and can have one or more hydroxyl groups. They can be aliphatic, cycloaliphatic, or aryl-substituted aliphatic alcohols. Preferably, the ester should not contain more than 40 carbons per molecule. The alcohols preferably should not contain more than 20 carbon atoms per molecule. Typical alcohols used in forming such ester reactants can be methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclohexyl, and benzyl alcohols.

The olefinic reactant for forming the lactones may also be an ester formed by reacting a saturated acid with an unsaturated alcohol. Any saturated acid and any unsaturated alcohol forming an ester having at least 16, and preferably not more than 40, carbon atoms per molecule may be employed. Thus, acids such as acetic acid and higher saturated acids and alcohols such as vinyl and higher unsaturated alcohols may be employed. The olefinic reactant may also be an ester formed by reacting an unsaturated acid with an unsaturated alcohol.

Further, for the preparation of the substituted gamma-butyrolactones of the present invention, employing the process disclosed in the aforementioned copending application, any carboxylic acid containing 2 to 5 carbon atoms may be employed for reaction with the mono- or poly-unsaturated monocarboxylic acid or ester. Thus, acetic, propanoic, butanoic, or pentanoic acid may be employed. The butanoic and pentanoic acids may be straight chain or may be branched chain acids. For example, the butanoic acid employed may be n-butanoic or isobutanoic acid. Further, for example, the pentanoic acid may be n-pentanoic or 2- or 3-methyl butanoic acid. Each of these acids has the formula

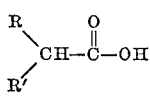
(3)

wherein R and R' are hydrogen or an alkyl group containing 1 to 3 carbon atoms. Where R and R' are each alkyl groups, the total number of carbon atoms in the two groups will not exceed 3.

An explanation of the synthesis reaction disclosed in the aforementioned application would appear to be helpful in understanding the nature of the substituted gamma-butyrolactones of the present invention. Assuming that the ion of higher valent form is trivalent manganese ion, the reaction is as follows:

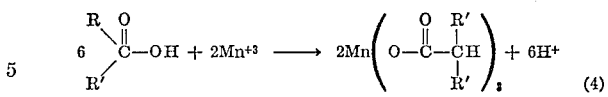
(4)

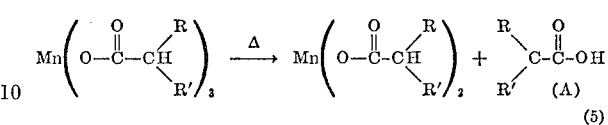
(5)

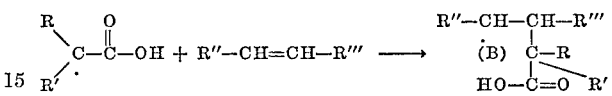
(6)

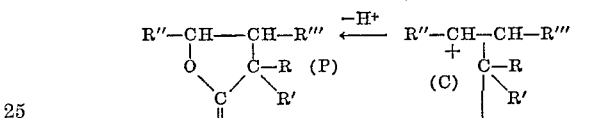
(7)

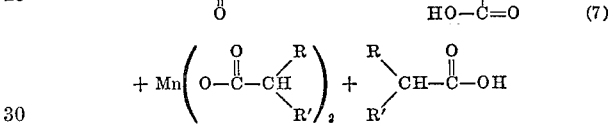

As shown in equation (4), the carboxylic acid reacts with the manganic ion to form the salt of the carboxylic acid. As shown in equation (5), the free radical (A) is produced when the salt is heated. According to the reaction of equation (6) which takes place in the presence of the olefinic reactant and product of equation (5), the free radical adds to the double bond of the olefinic reactant forming the free radical (B). The cation (C) then forms with reduction of Mn⁺³ to Mn⁺², and the cation (C) loses a hydrogen ion to form the substituted gamma-butyrolactone product (P).

It will be seen from the foregoing equations for the reaction that the R and R' substituents on the alpha carbon atom of the lactone are the R and R' substituents on the alpha carbon atom of the carboxylic acid. Thus, where acetic acid is the acid employed, R and R' will each be hydrogen. Similarly, where propanoic acid is employed, one of R or R' will be hydrogen and the other will be a methyl group.

Further, it will be seen from the foregoing equations for the reaction that the R'' and R''' substituents on the beta and gamma carbon atoms of the lactone will be the R'' and R''' substituents of the mono- or poly-unsaturated monocarboxylic acid or ester. Thus, where oleic acid,

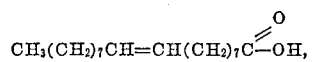

is employed, R'' can be —(CH₂)₇CH₃, an alkyl group, and R''' can be

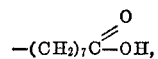

a carboxyalkyl group. Since, referring to equation (6), the free radical can add to either side of the double bond of the olefinic reactant, R'' can be

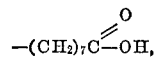

and R''' can be —(CH₂)₇CH₃. Where methyl oleate is employed, one of R'' or R''' will be —(CH₂)₇CH₃ and the other will be

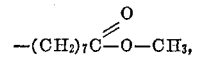

an esteralkyl group. Where the olefinic reactant is a poly-unsaturated monocarboxylic acid or ester, one of R″ and R‴ will be a carboxylalkenyl group or an esteralkenyl group, i.e., a group corresponding to a carboxyalkyl group or esteralkyl group, respectively, but containing at least one double bond.

In connection with the R″ and R‴ groups, the sum of the number of carbon atoms in the R″ and R‴ groups will be 2 less than the number of carbon atoms in the olefinic reactant. Thus, where the olefinic reactant is an acid containing 20 carbon atoms per molecule, the sum of the number of carbon atoms in the R″ and R‴ groups will be 18. Also, where the olefinic reactant is an ester formed by reacting an acid containing 20 carbon atoms with an alcohol containing 20 carbon atoms, the sum of the carbon atoms in the R″ and R‴ groups will be 38.

It was stated previously that the amount of carboxylic acid to be employed would be discussed later. Referring back to equation (6), it will be seen that the free radical attaches to one of the carbon atoms forming the double bond. Where a poly-unsaturated monocarboxylic acid or ester is employed, the free radical will be able to attach to one of the carbon atoms forming each of the double bonds producing a polylactone product. However, the tendency of the free radical to attach to a carbon atom of each of the double bonds is reduced where the amount of carboxylic acid in the reaction mixture provides no more than one molecule per molecule of mono- or poly-unsaturated monocarboxylic acid or ester. Thus, the reaction is carried out employing one mole of carboxylic acid for each mole of mono- or poly-unsaturated monocarboxylic acid in the reaction mixture.

The substituted gamma-butyrolactones of the invention are useful for various purposes. For example, the lactones may be opened up by hydrolysis to form a long chain dicarboxylic acid having a gamma-hydroxy group. Thus, by acid hydrolysis, a compound having the formula

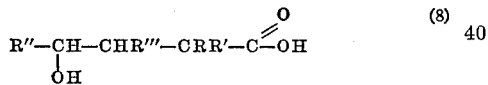
(8)

where either R″ or R‴ is a carboxy group, is obtained. The alkali metal salts of these compounds, as well as the condensation products of these acids with polyamines such as triethylenetetramine, tetraethylenepentamine, etc., are useful as detergents in hydrocarbon lubricating oils. The lactone can also be hydrogenated to produce a long chain saturated dicarboxylic acid having a gamma-hydroxy group and these can be used in forming alkyd resins by condensation with polyols such as ethylene glycol, propylene glycol, glycerol, pentaerythritol, etc. The lactones per se are also useful as lubricants for metal parts. They may be applied to the surfaces of metal parts in contact with each other which parts are intended to be movable with respect to each other. For example, the lactones, particularly the lactones prepared in Example 2, are effective lubricants for metal door hinges which tend to become frozen.

The following examples serve to illustrate the invention.

EXAMPLE 1

Oleic acid is dissolved in glacial acetic acid to form a solution approximately 0.1 molar with respect to oleic acid. To such a solution there are added 2 mole equivalents of manganic acetate dihydrate, $Mn(C_2H_3O_2)_3 \cdot 2H_2O$, and about 300 grams per liter of anhydrous potassium acetate; the latter serves to suppress any undesired side products. The resulting solution is then heated to reflux under a nitrogen atmosphere until the brown manganic color disappears. Thereafter, the resulting lactone product is separated from the reaction mixture by extraction with diethyl ether.

The lactone product comprises a mixture of

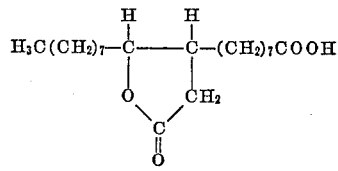

beta-carboxyheptyl-gamma-octyl-butyrolactone and

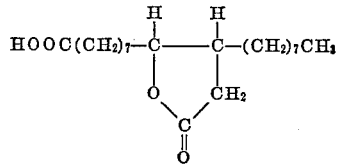

beta-octyl-gamma-carboxyheptyl-butyrolactone.

EXAMPLE 2

Methyl oleate can be substituted for oleic acid in the procedure of Example 1 and the resulting lactone product comprises a mixture of the methyl esters of the lactones of Example 1. The esters are

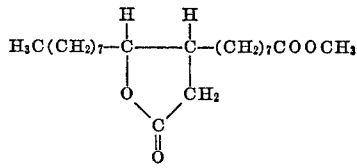

beta - carboxyheptyl methyl ester - gamma-octyl-butyrolactone and

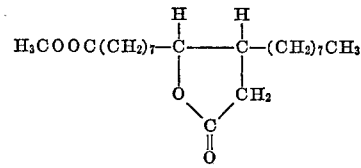

beta - octyl - gamma-carboxyheptyl methyl ester-butyrolactone.

EXAMPLE 3

The procedure of Example 1 is repeated except for the substitution of propionic acid for acetic acid and of manganic propionate dihydrate for manganic acetate dihydrate. The product comprises

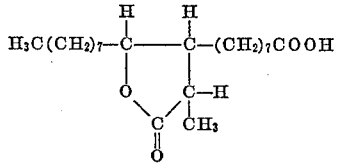

alpha - methyl - beta-carboxyheptyl-gamma-octyl-butyrolactone and

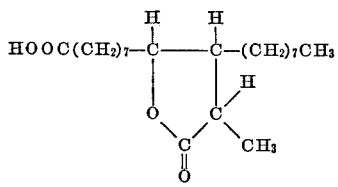

alpha-methyl-beta-octyl-gamma - carboxyheptyl-butyrolactone.

EXAMPLE 4

Linoleic acid is dissolved in glacial acetic acid to form a solution about 1 molar with respect to linoleic acid. To this solution there is added 1 mole equivalent of manganic acetate dihydrate and about 300 grams per liter of anhydrous potassium acetate. The resulting solution is heated and treated as in Example 1. The lactone product comprises a mixture including

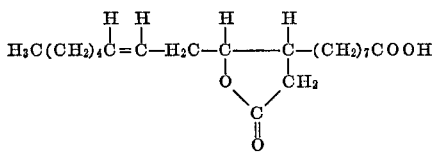

beta-carboxyheptyl-gamma-octylene(2)-butyrolactone

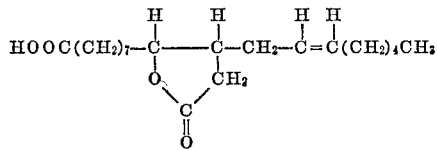

beta-octylene(2)-gamma-carboxyheptyl-butyrolactone

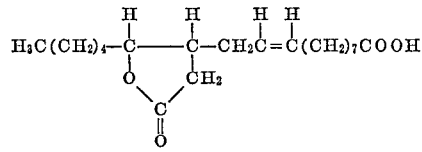

beta-carboxydodecylene(8) - gamma-pentyl-butyrolactone and

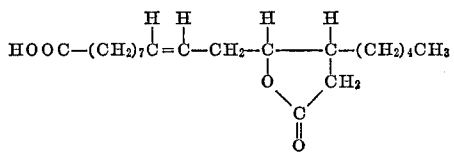

beta - pentyl - gamma-carboxydodecylene(8) - butyrolactone.

EXAMPLE 5

Linolenic acid is dissolved in glacial acetic acid to form a solution about 1 molar with respect to linolenic acid. To this solution there are added 0.5 mole equivalent of manganic acetate dihydrate and about 300 grams per liter of anhydrous potassium acetate. The resulting solution is heated and treated as in Example 1. The lactone products include the following

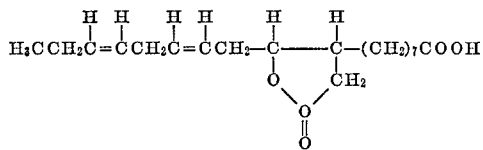

beta-carboxyheptyl - gamma-octyldiene(2,5) - butyrolactone

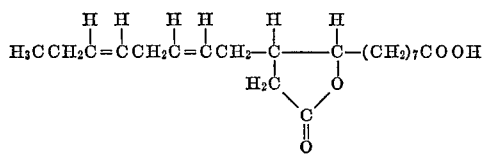

beta-octyldiene(2,5) - gamma - carboxyheptyl - butyrolactone

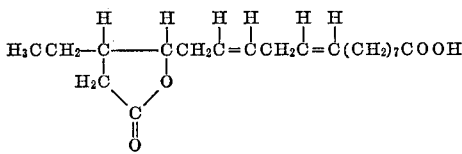

beta-ethyl - gamma - carboxytridecyldiene(8,11)-butyrolactone and

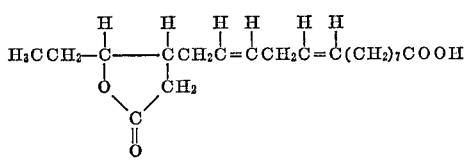

beta-carboxytridecylinen(8,11) - gamma - ethyl-butyrolactone.

What is claimed is:
1. The lactone which is beta-carboxyheptyl-gamma-octyl-butyrolactone.
2. The lactone which is beta-octyl-gamma-carboxyheptyl-butyrolactone.
3. The lactone which is alpha-methyl-beta-carboxyheptyl-gamma-octyl-butyrolactone.
4. The lactone which is alpha-methyl-beta-octyl-gamma-carboxyheptyl-butyrolactone.
5. The lactone which is beta-carboxyheptyl-gamma-octylene(2)-butyrolactone.
6. The lactone which is beta-octylene(2)-gamma-carboxyheptyl-butyrolactone.
7. The lactone which is beta-carboxydodecylene(8)-gamma-pentyl-butyrolactone.
8. The lactone which is beta-pentyl-gamma-carboxydodecylene(8)-butyrolactone.
9. The lactone which is beta-carboxyheptyl-gamma-octylidene(2,5)-butyrolactone.
10. The lactone which is beta-octyldiene(2,5)-gamma-carboxyheptyl-butyrolactone.
11. The lactone which is beta-ethyl-gamma-carboxytridecyldiene(8,11)-butyrolactone.
12. The lactone which is beta-carboxytridecyldiene-(8,11)-gamma-ethyl-butyrolactone.

References Cited
UNITED STATES PATENTS
3,155,685  11/1964  Prill et al. _____ 260—343.6
3,270,035  8/1966  Roe et al. _____ 260—343.6

DONALD G. DAUS, Primary Examiner
A. M. T. TIGHE, Assistant Examiner

U.S. Cl. X.R.
252—56 R; 260—76, 405.5, 413, 429 R, 439 R

UNITED STATES PATENT OFFICE
CERTIFICATE OF CORRECTION

Patent No. 3,813,416     Dated May 28, 1974

Inventor(s) El Ahmadi I. Heiba and Ralph M. Dessau

It is certified that error appears in the above-identified patent and that said Letters Patent are hereby corrected as shown below:

Column 4, line 5, formula (4) should read:

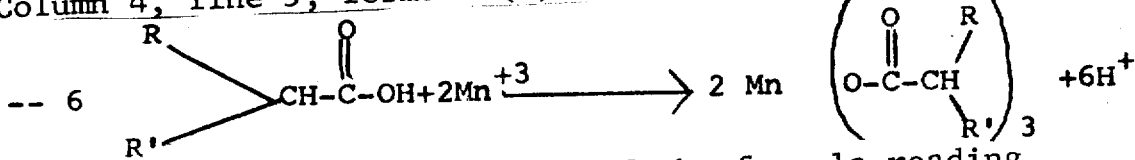

Column 4, line 9, that portion of the formula reading

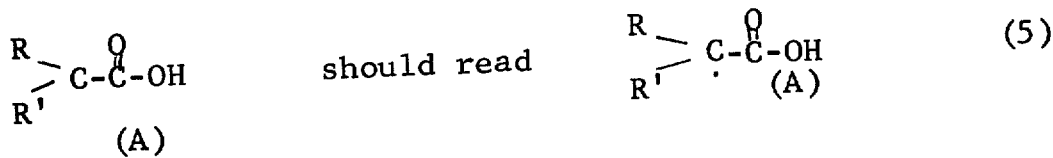      should read           (5)

Column 7, line 46, that portion of the formula reading

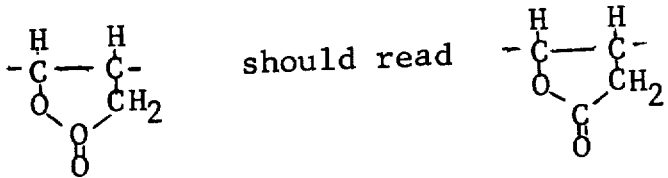       should read

Column 8, line 21, "beta-carboxytridecylinen(8,11)" should read --beta-carboxytridecyldiene(8,11)--;

Column 8, claim 9, "octylidene(2,5)-butyrolactone" should read --octyldiene(2,5)-butyrolactone--.

UNITED STATES PATENT OFFICE
CERTIFICATE OF CORRECTION

Patent No. 3,813,416  Dated May 28, 1974

Inventor(s) El Ahmadi I. Heiba and Ralph M. Dessau

It is certified that error appears in the above-identified patent and that said Letters Patent are hereby corrected as shown below:

Column 4, line 5, formula (4) should read:

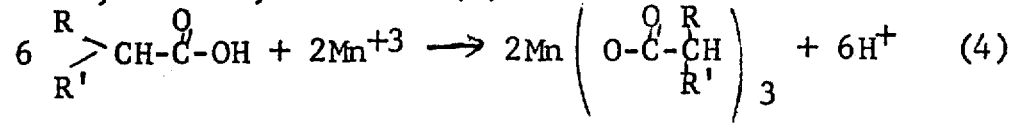

Column 4, line 9, that portion of the formula reading

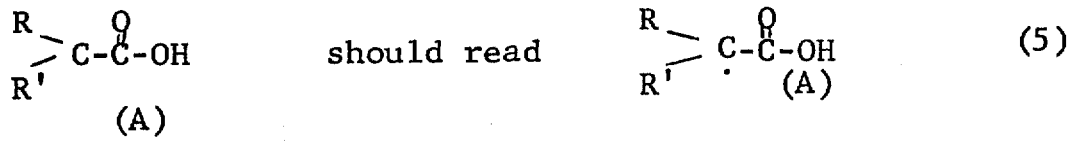

Column 7, line 46, that portion of the formula reading

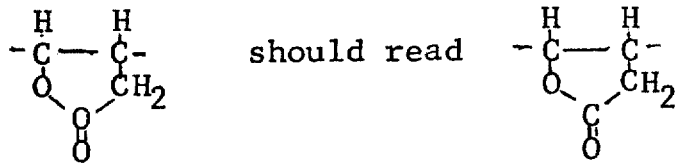

Column 8, line 21, "beta-carboxytridecylinen(8,11)" should read --beta-carboxytridecyldiene(8,11)--;

Column 8, claim 9, "octylidene(2,5)-butyrolactone" should read --octyldiene(2,5)-butyrolactone--.

Signed and sealed this 31st day of December 1974.

(SEAL)
Attest:

McCOY M. GIBSON JR.      C. MARSHALL DANN
Attesting Officer         Commissioner of Patents